Dec. 22, 1959    R. K. BAILEY    2,917,867
HYDROPONIC APPARATUS AND TRAY THEREFOR
Filed May 7, 1958    3 Sheets-Sheet 1

INVENTOR.
RALPH K. BAILEY
BY
Marechal, Biebel, French & Bugg
ATTORNEYS

Dec. 22, 1959    R. K. BAILEY    2,917,867
HYDROPONIC APPARATUS AND TRAY THEREFOR
Filed May 7, 1958    3 Sheets-Sheet 2

INVENTOR.
RALPH K. BAILEY
BY
Marechal, Biebel, French & Bugg
ATTORNEYS

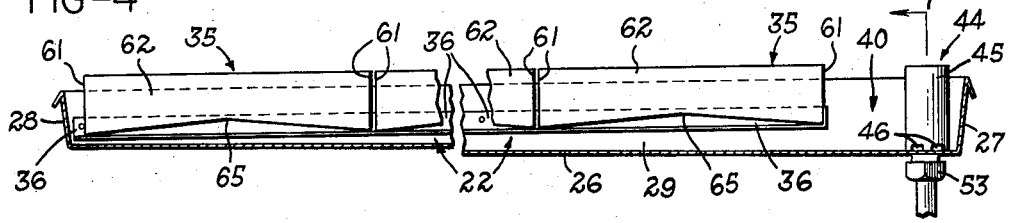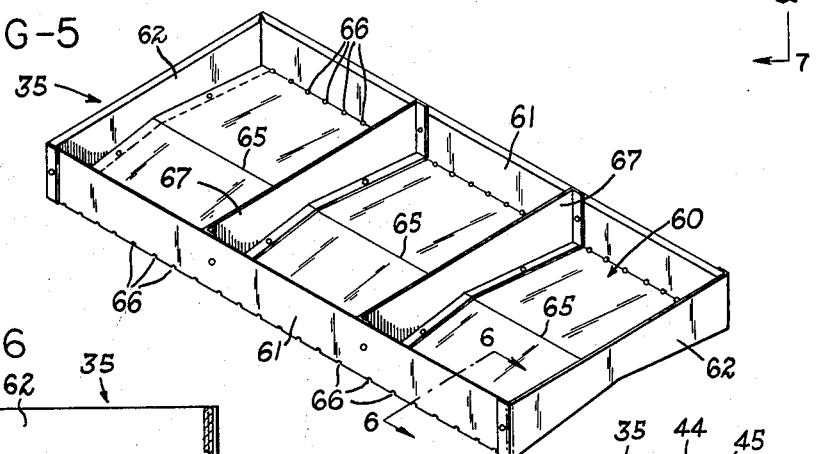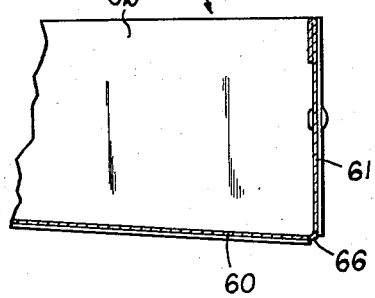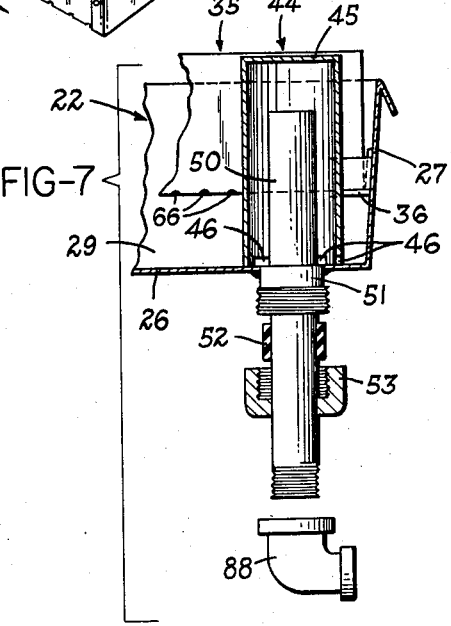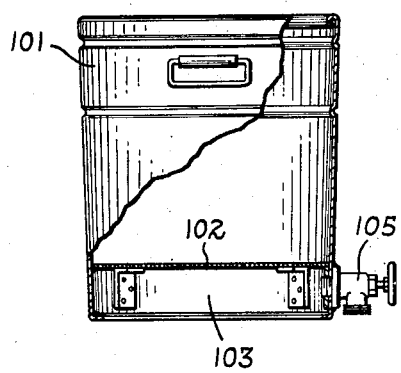

United States Patent Office 2,917,867
Patented Dec. 22, 1959

2,917,867

HYDROPONIC APPARATUS AND TRAY THEREFOR

Ralph K. Bailey, Springfield, Ohio, assignor to The Buckeye Corporation, Springfield, Ohio, a corporation of Delaware Application May 7, 1958, Serial No. 733,658

5 Claims. (Cl. 47—1.2)

This invention relates to apparatus for the soilless germination of seed and growth of grass and other plant material therefrom.

The germination and growth of seed in chemical solutions in the absence of soil, known as hydroponics, particularly to grow various types of grass and other forage material, offers important advantages in providing fresh green feed for livestock and other farm animals during the seasons of the year when they would not otherwise normally be available. Thus livestock grazing is reduced or impossible during winter months in many regions, and sometimes similar conditions exist during prolonged dry spells in the summer and fall. Great benefits would result to the stock and therefore to the farmer if during such periods it were possible to have a simple and economical source of fresh green plant material, particularly as a conditioning or supplement food, and the present invention is directed generally to this basic objective.

It is a primary object of the present invention to provide simple and efficient apparatus of novel construction for the hydroponic production of fresh green forage materials which will function efficiently independently of outdoor weather conditions, which will therefore serve as a source of such forage materials when they are normally not otherwise available, and which is adapted for construction as an independent building not requiring enclosure within an existing building.

Another object of the invention is to provide hydroponic apparatus as outlined above which is constructed to receive an operator freely therewithin for working purposes and which incorporates structure for supporting a plurality of trays of growing materials in tiers for maximum convenience of operation and efficiency of production in apparatus of given size.

An additional object of the invention is to provide hydroponic seed germinating and growing apparatus as outlined above which incorporates means for supplying selectively heated or cooled air to the growing plants to maintain substantially constant surrounding temperature conditions.

A further object of the invention is to provide hydroponic apparatus as outlined above which incorporates an improved syphon system for supplying nutrient liquid to the growing plant material at desired intervals and which at the same time offers maximum assurance against over-wetting of the growing seeds and similar conditions which might cause mold or other disadvantageous effects.

It is also an object of the invention to provide a tray of improved structure for use in hydroponic apparatus as outlined above which is constructed to assure an effective supply of the nutrient liquid to all of the seed and roots therein while at the same time also facilitating both proper drainage of the liquid from the tray and also easy removal of the grown plants from the tray.

Other objects and advantages of the invention will be apparent from the following description, the accompanying drawings and the appended claims.

In the drawings:

Fig. 4 is a fragmentary view on a larger scale through one level of the supporting structure in Figs. 1 and 2 as indicated by the line 4—4 of Fig. 1;

Fig. 5 is a perspective view of one of the trays incorporated in the apparatus of Figs. 1–4;

Fig. 6 is an enlarged fragmentary section on the line 6—6 of Fig. 5;

Fig. 7 is an enlarged partially exploded view generally on the line 7—7 of Fig. 4; and Fig. 8 is an enlarged side elevation, partly broken away, showing one of the seed soaking containers which are mounted on the wall of the apparatus as shown in Fig. 1.

Figure 1:
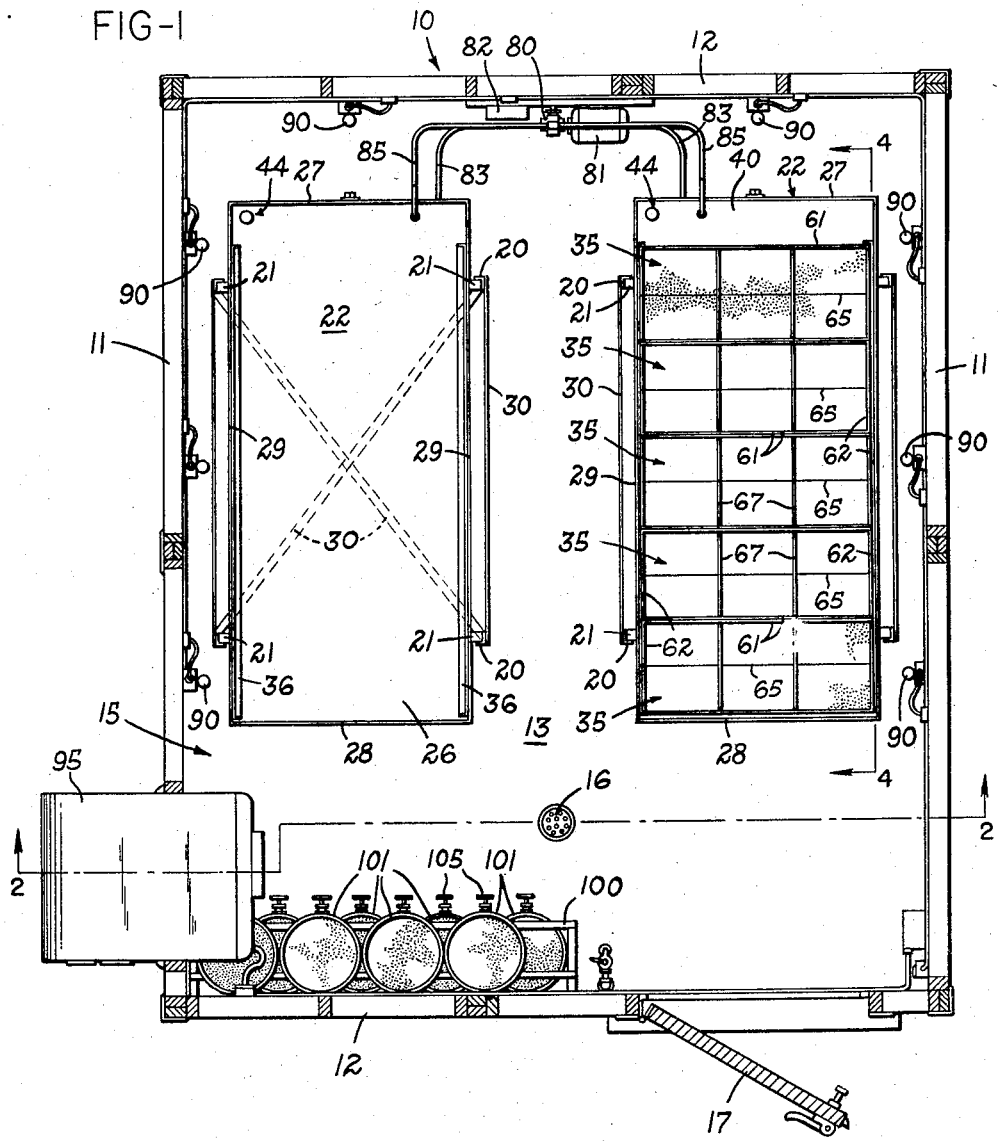
Fig. 1 is a horizontal view taken generally as indicated by the line 1—1 of Fig. 2 and looking downwardly on the interior of hydroponic apparatus constructed in accordance with the invention.
Figure 2:
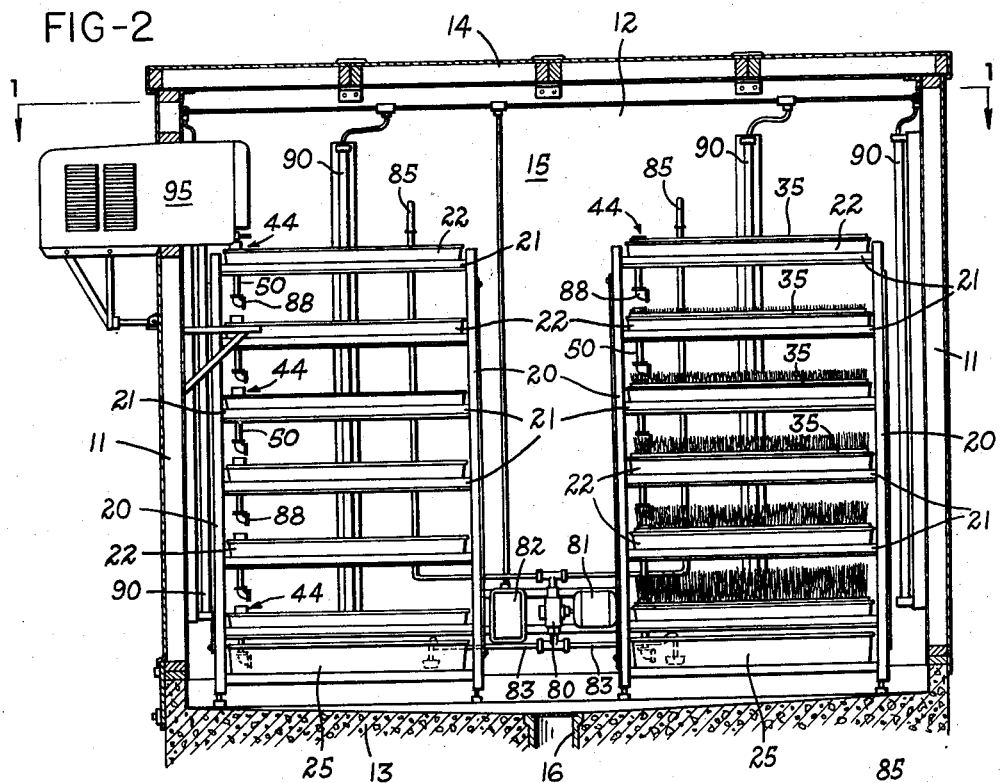
Fig. 2 is a view in vertical section taken as indicated by the line 2—2 of Fig. 1.

Referring to the drawings, which show a preferred embodiment of the present invention, the hydroponic apparatus 10 in Figs. 1 and 2 includes side walls 11 and end walls 12 extending upwardly from a concrete foundation slab 13 and an upper wall or roof 14 which closes the structure. The walls and foundation cooperate to define a closed germinating and growing chamber 15 isolated from atmospheric temperature and humidity conditions. The foundation 13 slopes inwardly slightly toward a drain tile 16 so that any excess liquid present within chamber 15, for any reason whatsoever, can be drained away, and one of the end walls 11 is provided with a door 17 to provide entry into chamber 15 to load the apparatus with seed or to remove plants when they reach proper size. The apparatus is therefore advantageously made large enough for an operator to enter and generally resembles a shed in outward appearance, although smaller structures can be constructed where desired.

Figure 3:
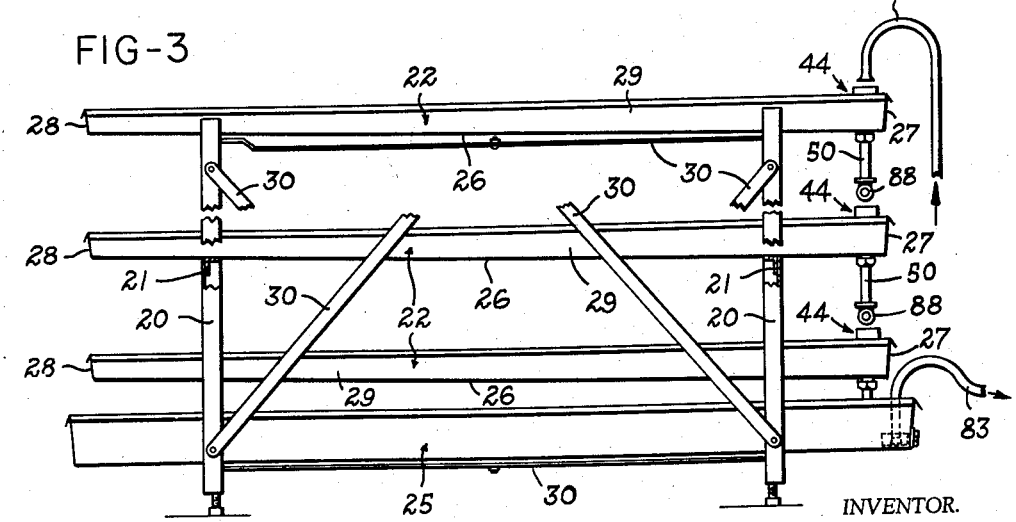
Fig. 3 is a fragmentary side elevation of one of the framework structures within the apparatus of Figs. 1 and 2.

The structure for supporting the seed and growing plant material within the chamber 15 includes a framework composed of uprights 20 and cross bars 21 which may conveniently comprise angle bars and cooperate to define tiers for supporting a plurality of vertically spaced pans 22, and a nutrient liquid supply pan or reservoir tank 25 is similarly supported near the bottom of each tier. Each pan 22 is generally rectangular and includes a bottom 26 which slopes downwardly from one end of the pan to the other so that liquid introduced within the pan will flow toward the lower end thereof. The end wall 27 of each pan is therefore of greater height than the opposing end wall 28, and the side walls 29 vary in height to provide a substantially level upper edge for the entire pan. The cross bars 21 are accordingly vertically spaced to support the pans 22 with their upper surfaces substantially level as shown in Fig. 3, and each framework 20—21 may also include appropriate cross braces 30.

Each of the pans 22 is of sufficient size to hold a plurality of seed germinating and plant growing trays 35, five being shown, and the support for these trays is provided by longitudinally extending, horizontally disposed angle bars 36 which are attached to the inner surfaces of side walls 29. Preferably no tray 35 is located immediately adjacent the end wall to create a space 40 between end wall 27 and the nearest tray 35 in which no seed is located, either for germination or for growth, and in which a siphon unit 44 is located for draining liquid from one pan 22 into the next lower pan.

One of the siphon units 44 is shown in detail in Fig. 7, and it includes a hood-like cap 45 which is supported on the bottom wall 26 of the pan 22 and is provided in its lower edge with a plurality of notches 46 forming connecting passages between the interior of the cap 45 and the interior of the pan 22. The siphon unit also includes a spout 50 which is mounted with its upper end extending within the cap 45 by means of a nipple 51 welded or otherwise secured to the pan bottom wall 26. The spout 50 is held in the nipple 51 by means of the rubber washer 52 and cover nut 53 as shown in Fig. 7.

With this siphon construction, it will be seen that whenever liquid is supplied to the interior of a pan 22, it will rise therein until it reaches the level of the upper end of the spout 50. When this occurs, the liquid will then flow over and down within the spout 50, which will initiate a siphon action in which the cap 45 serves as the short leg of the siphon and the spout 50 serves as the long leg. Once the siphoning action has been started, it will continue until substantially all of the liquid has been removed from the pan except the small amount to fill the cap 45 below the upper end of the spout 50, and it will also be seen that the spout 50 may readily be adjusted vertically to establish a desiired liquid level in the pan 22 before siphoning begins.

The several trays 35 may be of identical construction, and one is shown in detail in Figs. 4–6. It includes a bottom wall 60 and side walls 61 which may readily be formed from a single sheet metal sheet, and the end walls 62 are shown as separate pieces welded or otherwise secured to the bottom and side walls 60—61 to complete the tray. The bottom wall 60 has the shape of a relatively flat inverted trough to provide a centrally located crest 65 therein from which the resulting two bottom panels slope downwardly toward the side walls 61 to facilitate drainage toward the side edges of the tray, which are provided with multiple spaced drain openings 66 as shown in Fig. 5. In addition, the interior of each tray 35 may be provided as shown with a plurality of laterally extending partitions 67 which are welded or riveted in position.

The seed and growing plants are actually contained in the trays 35, and the sloping bottom 60 of each tray together with the drainage openings 66 to facilitate distribution of liquid nutrient throughout the tray as well as ready withdrawal of excess liquid if the feeding has been completed. In addition, the location of the drainage openings 66 along the edges of the trays minimizes the tendency for the plant rots to grow therethrough and thus both to obstruct drainage and to interfere with removal of the grown forage from the tray. The partitions 67 provide a bracing action on the trays, and they are also useful for serving to measure the contents of each tray, since they may be located initially in the tray in such spaced positions that each of the resulting tray sections will produce a desired unit quantity of forage such as a sufficient quantity for a single feeding of a domestic animal.

Provision is made for supplying nutrient liquid to each tier of pans 22 at desired time intervals. Referring to Figs. 1 and 2, a pump 80 is operated by a motor 81 under the control of a time relay 82. An intake pipe 83 connects the suction side of the pump 80 with each of the reservoir pans 25 at the bottom of the several tiers 20—21, and an output pipe 85 connects the discharge side of the pump 80 with the uppermost pan 22 of each tier. As indicated in Fig. 1, the pipes 85 are located to discharge in the spaces 40 so that liquid will flow directly into the pans 22 rather than onto any of the growing plant material in the trays 35, and the elbow 88 on the lower end of each spout 50 serves to lessen the directly downward flow of liquid and thus to reduce splashing.

During a feeding cycle, as the nutrient liquid is introduced into the uppermost pan 22, the liquid level will first rise within the pan until it reaches the drainage openings 66 in the trays 35 therein, and it will then flow through these holes into the interior of the trays to soak the seed or the plant roots contained therein. The liquid level will continue to rise in the upper most pan 22 until it reaches the top of the associated siphon spout 50, whereupon the siphoning action will begin from such uppermost pan to the next lower pan 22. Since some of the liquid is absorbed by the seed and plant material, more liquid is supplied to the uppermost pan than it can hold when full, approximately 1½ times the maximum capacity of a single pan being adequate. However, the siphon 44 is proportioned to cause drainage from the pan at a rate sufficient to prevent the pan from overflowing, and the circulation of the liquid will therefore continue even after the timer 82 has shut off the pump motor 81 until unabsorbed liquid is returned to the pans 25.

Provision is also made in accordance with the invention for supplying light to the growing plant materials in the chamber 15, which is particularly desirable in the case of grain to be grown as green feed for livestock such as horses and cows. Referring to Figs. 1 and 2, means are provided for mounting a plurality of fluorescent tubes 90 on the walls 11 and 12 in position to extend the entire height of each of the tiers 20—21. This arrangement of tubes 90 has been found to provide adequate light for each of the trays 35, and appropriate switches (not shown) may be provided to turn off the tubes 90 when they are not needed.

Preferred results are obtained with the apparatus of the invention if optimum temperature conditions are maintained within the chamber 15, particularly during germination of fresh seed and also during the growing period of the plant material. Such temperature and humidity control are important in assuring growth at the maximum rate as well as in preventing the possible development of seed mold during and shortly following germination, with a temperature in the range of 65° to 75° F. being desirable. Since the apparatus of the invention is designed to be capable of use as an independent structure rather than requiring installation within an existing building, it would in the absence of special provision tend to be more subject to outside weather conditions, and the invention makes appropriate provision for this fact.

Referring to Figs. 1 and 2, a combined heating and air conditioning unit 95 is supported within one of the side walls of the apparatus in position to form an inlet for fresh outside air to the interior of the chamber 15. Units 95 of the desired characteristics are available commercially under the general designation of heat pump, or reverse cycle air conditioner and they are constructed to maintain the air discharged therefrom within a desired temperature range, with this objective being accomplished by heating the air when it is below the desired range and cooling when it is above such range. The incorporation of such unit 95 in the apparatus of the invention therefore assures maximum efficiency from the standpoint of maintained temperature conditions, particularly in combination with the related humidity conditions resulting from the liquid supply system for the pans 22 as described.

The apparatus of the invention also incorporates means for preconditioning fresh seed before it is placed in the several trays 35 for germination. Referring to Fig. 1, a plurality of horizontal racks 100 are shown as mounted on the end wall 12 adjacent the door 17, and these racks 100 support a plurality of containers 101 in which fresh seed may be soaked in liquid before being placed in a tray 35. For example, it has been found that with the temperature and humidity conditions maintained by the other components of the invention, preferred results are obtained by soaking fresh seed in water from 3 to 24 hours and then draining the water therefrom and permitting the wet seed to stand within the atmosphere of the chamber 15 for the balance of a total of 48 hours before it is placed in a tray 35.

The arrangement and cycle just described is facilitated by the construction of the containers 101 illustrated in Fig. 8. which shows a perforated false bottom 102 within the container to form a drainage chamber 103 into which the seed cannot pass and which can be drained by means of the valve 105. The provision of this preconditioning means for the seed further increases the efficiency and capacity of the apparatus of the invetnion, since fresh seed can be preconditioned while all the trays 35 are still being used to grow forage. Then as soon as a tray 35 is emptied, it can be recharged with preconditioned seed to minimize the period required for germination in the tray. All of these features therefore contribute to the practical advantages provided by the invention.

While the form of apparatus herein described constitutes a preferred embodiment of the invention, it is to be understood that the invention is not limited to this precise form of apparaus, and that changes may be made therein without departing from the scope of the invention which is defined in the appended claims.

What is claimed is:

1. Apparatus for the hydroponic growth of plants from seed, comprising walls forming an enclosure of substantial size adequate for free access by an operator, framework means within said enclosure forming at least one tier for supporting a plurality of vertically spaced trays containing the plant material to be grown, each of said tiers including a plurality of vertically spaced pans for receiving said trays, at least one tray in each said pan each including four side walls and an essentially imperforate bottom wall, said tray bottom wall including a pair of panels sloping upwardly from the bottom edges of opposed said side walls to a generally centrally located crest, each said tray having a plurality of drainage openings located at the junction of the lowermost edges of said bottom wall and the adjacent said side walls, means in said pans for supporting said trays in upwardly spaced relation with the bottoms of said pans, means for supplying nutrient liquid to the interior of the uppermost said pan to a maximum level higher than said crest of each said tray therein to cause said liquid to enter said tray through said drainage openings therein, and means for successively draining each said pan to the next lower said pan.

2. Apparatus for the hydroponic growth of plants from seed, comprising walls forming an enclosure of substantial size adequate for free access by an operator, framework means within said enclosure forming at least one tier for supporting a plurality of vertically spaced trays containing the plant material to be grown, each of said tiers including a plurality of vertically spaced pans for receiving said trays, at least one tray in each said pan each including four side walls and an essentially imperforate bottom wall, said tray bottom wall including a pair of panels sloping upwardly from the bottom edges of opposed said side walls to a generally centrally located crest, each said tray having a plurality of drainage openings located at the junction of the lowermost edges of said bottom wall and the adjacent said side walls, said pans having longitudinally extending horizontally disposed angle bars fixed thereto for supporting said trays in upwardly spaced relation with the bottoms of said pans, means for supplying nutrient liquid to the interior of the uppermost said pan to a maximum level higher than said crest of each said tray therein to cause said liquid to enter said tray through said drainage openings therein, and means for successively draining each said pan to the next lower said pan.

3. In apparatus for the hydroponic growth of plants from seed, the combination of a pan for containing a plurality of trays containing the plant material to be grown, each said tray including four side walls and an essentially imperforate bottom wall for the ready removal of said plant material therefrom, said tray bottom wall including a pair of panels sloping upwardly from the bottom edges of opposed said side walls to a generally centrally located crest, each said tray having a plurality of drainage openings located at the junction of the lowermost edges of said bottom wall and the adjacent said side walls, means in said pan for supporting said trays in upwardly spaced relation with the bottoms of said pan, means for supplying nutrient liquid to the interior of said pan to a maximum level higher than said crest of each said tray therein to cause said liquid to enter said tray through said drainage openings therein, and means for draining said pan when said liquid reaches said maximum level.

4. A tray for containing plant material to be grown in apparatus for the hydroponic growth of plants from seed, comprising four side walls and an essentially imperforate bottom wall providing for the retention of plant roots within said tray and for the ready removal of said plants upon the inversion thereof, said bottom wall including a pair of panels sloped upwardly from the bottom edges of opposed said side walls to a generally centrally located crest, and said tray having a plurality of openings located at the junction of the lowermost edges of said bottom wall and the adjacent said side walls for the passage therethrough of nutrient liquid to and from the interior of said tray.

5. A tray for containing plant material to be grown in apparatus for the hydroponic growth of plants from seed, comprising four side walls and an essentially imperforate bottom wall providing for the retention of plant roots within said tray and for the ready removal of said plants upon the inversion thereof, said bottom wall including a pair of panels sloped upwardly from the bottom edges of opposed said side walls to a generally centrally located crest, said tray having a plurality of openings located at the junction of the lowermost edges of said bottom wall and the adjacent said side walls for the passage therethrough of nutrient liquid to and from the interior of said tray, and at least one partition wall secured to said bottom wall and said opposed said side walls to provide a bracing action therebetween.

References Cited in the file of this patent

UNITED STATES PATENTS

| 1,631,802 | Evert | June 7, 1927 |
| 1,983,806 | Norman | Dec. 11, 1934 |
| 2,658,310 | Cook | Nov. 10, 1953 |

FOREIGN PATENTS

| 744,200 | Great Britain | Feb. 1, 1956 |
| 123,692 | Switzerland | Dec. 16, 1927 |

OTHER REFERENCES

Publication: Sunday Star (Newspaper), Washington, D.C., published September 29, 1935, Part One, page A-6, article "Farming Without Dirt."